(12) United States Patent
Nakaji

(10) Patent No.: US 11,203,253 B2
(45) Date of Patent: Dec. 21, 2021

(54) WORK VEHICLE HAVING A MOVABLE LOWER SHIELD OF A WINDSHIELD

(71) Applicant: Kubota Corporation, Osaka (JP)

(72) Inventor: Masaru Nakaji, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/930,733

(22) Filed: May 13, 2020

(65) Prior Publication Data
US 2021/0078389 A1 Mar. 18, 2021

(30) Foreign Application Priority Data
Sep. 17, 2019 (JP) .............................. JP2019-168074

(51) Int. Cl.
*B60J 1/06* (2006.01)
*B60J 1/00* (2006.01)

(52) U.S. Cl.
CPC ...... *B60J 1/06* (2013.01); *B60J 1/005* (2013.01)

(58) Field of Classification Search
CPC ............. B60J 1/06; B60J 1/1892; B60J 5/106
USPC ............................................. 296/86–89, 92
See application file for complete search history.

(56) References Cited

U.S. PATENT DOCUMENTS

| | | | | |
|---|---|---|---|---|
| 914,557 | A * | 3/1909 | Dillingham ................ | B60J 1/06 296/88 |
| 1,121,576 | A * | 12/1914 | Ackerman ................ | B60J 1/04 296/92 |
| 1,312,542 | A * | 8/1919 | Herbst ...................... | B60J 1/06 296/88 |
| 5,961,175 | A * | 10/1999 | Clardy, Jr. ......... | B62D 33/0617 296/102 |
| 7,334,833 | B2 * | 2/2008 | Koelbl .................... | B60J 5/101 296/146.8 |
| 8,936,296 | B1 | 1/2015 | Fedders | |
| 2011/0001331 | A1 * | 1/2011 | Hirneise ................... | B60J 1/06 296/87 |
| 2015/0043051 | A1 | 2/2015 | Woodrow | |
| 2017/0282691 | A1 | 10/2017 | Woodrow | |
| 2019/0030998 | A1 | 1/2019 | Woodrow | |
| 2019/0030999 | A1 | 1/2019 | Woodrow | |
| 2019/0299754 | A1 | 10/2019 | Woodrow | |
| 2019/0389280 | A1 * | 12/2019 | Mauro .................... | E05D 15/16 |

FOREIGN PATENT DOCUMENTS

| | | | | |
|---|---|---|---|---|
| DE | 4404415 | * | 8/1995 | ............... B60J 1/06 |
| DE | 2256468 A | * | 5/1997 | |
| DE | 10032915 A1 | * | 1/2002 | ........... B60J 1/1892 |
| DE | 202006001230 U1 | * | 6/2007 | ........... B60J 1/1884 |
| DE | 20201000040 U1 | | 4/2010 | |
| DE | 102015001869 A1 | | 8/2016 | |

(Continued)

*Primary Examiner* — D Glenn Dayoan
*Assistant Examiner* — Kevin P Weldon
(74) *Attorney, Agent, or Firm* — The Webb Law Firm

(57) ABSTRACT

In a work vehicle, a windshield provided at a front portion of a vehicle body includes an upper shield disposed upwardly of a hood and a lower shield that can be disposed at a position closing a gap formed between a lower end of the upper shield and an upper face of the hood. There is provided a support unit configured to support the lower shield vertically movably to be capable of selectively disposing the lower shield at the closing position for closing the gap and an opening position for opening the gap.

5 Claims, 7 Drawing Sheets

(56) References Cited

FOREIGN PATENT DOCUMENTS

| JP | 57182520 | A | * | 11/1982 | ............ | B60J 1/1892 |
| JP | 57191120 | A | * | 11/1982 | ............ | B60J 1/1892 |
| JP | 2014118126 | A |   | 6/2014 |   |   |

* cited by examiner

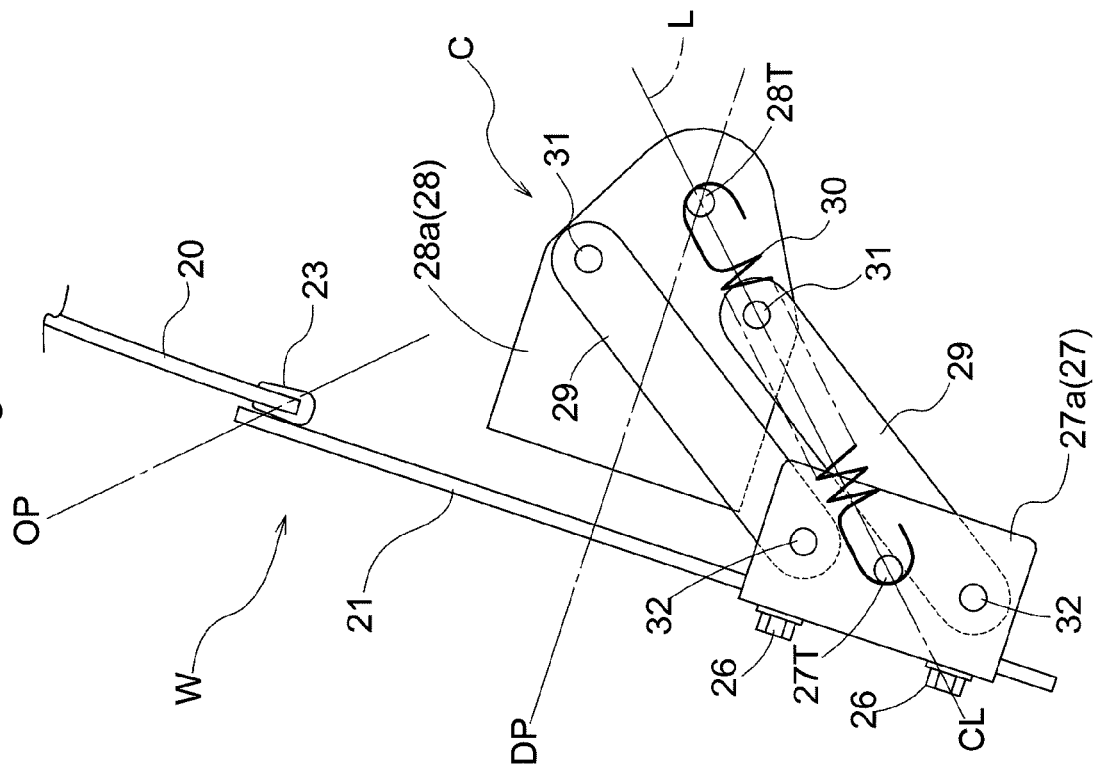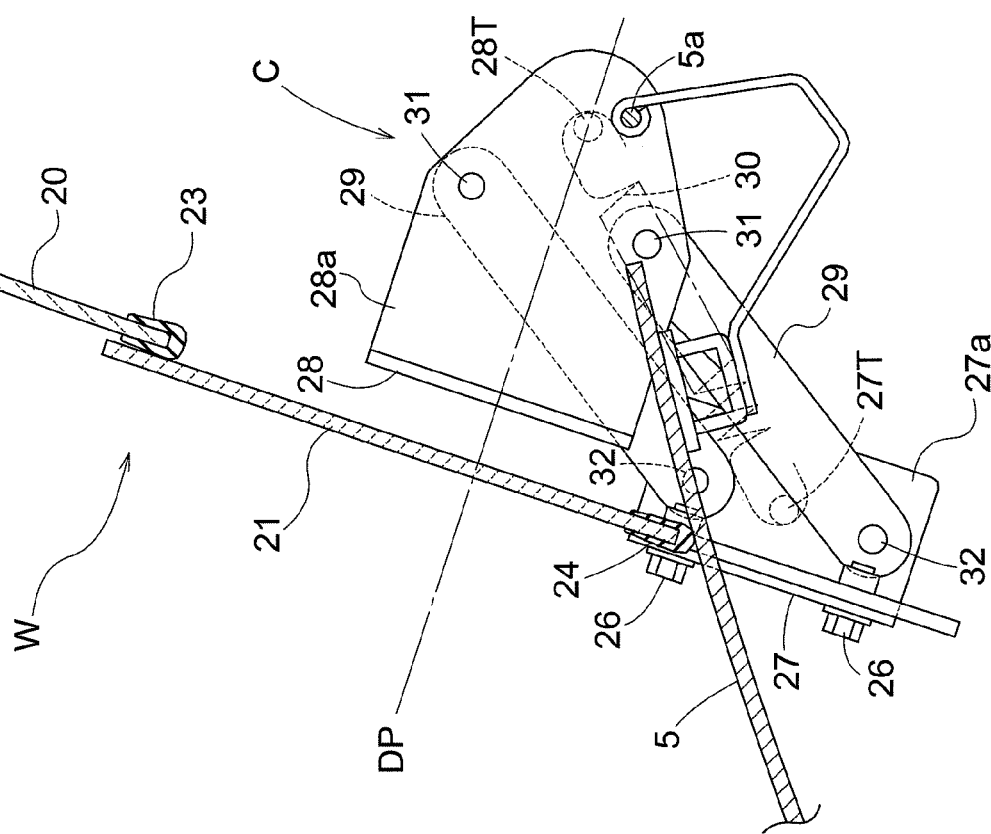

WORK VEHICLE HAVING A MOVABLE LOWER SHIELD OF A WINDSHIELD

CROSS-REFERENCE TO RELATED APPLICATION

This application claims priority to Japanese Patent Application No. 2019-168074 filed Sep. 17, 2019, the disclosure of which is hereby incorporated by reference in its entirety.

BACKGROUND OF THE INVENTION

Technical Field

The present invention relates to a work vehicle having a windshield mounted rearwardly of a hood (engine hood) and forwardly of a driver's seat.

Background Art

As a work vehicle having the above-described arrangement, Patent Document 1 discloses an arrangement in which a windshield is mounted to pillars disposed on the left and right sides of the vehicle body.

In this Patent Document 1, forwardly of a driver's seat and rearwardly of a hood, front end portions of the pillars are disposed under a vertical posture and the windshield is detachably mounted to the pillars via a mount unit.

BACKGROUND ART DOCUMENT

Patent Document

Patent Document 1: Japanese Unexamined Patent Application Publication No. 2014-118126

SUMMARY OF THE INVENTION

Problem to be Solved by Invention

Here, it is assumed that a work vehicle includes a windshield disposed at a position overlapped with a rear portion of a hood as seen in a plan view. With such arrangement having the windshield in the above-described manner, it is possible to increase the space forwardly of the driver's seat.

However, in the case of an arrangement in which the hood is opened/closed about a horizontally oriented axis on the rear side of the hood, when the hood is opened, there may occur inconvenience of the upper face of the hood coming into inadvertent contact with the lower end of the windshield. In view of this, it is conceivable to detach the windshield by operating the mount unit as disclosed in Patent Document 1. But, this arrangement is troublesome.

Further, it is also conceivable to configure such that for enabling opening of the windshield, the windshield is formed of two separate parts consisting of an upper part and a lower part, so that only the lower windshield part is to be attached/detached by the mount unit disclosed in Patent Document 1. However, there remains room for improvement with the above arrangement in the respect of troublesomeness.

For the reasons mentioned above, there is a need for a work vehicle that allows opening/closing of a hood without impairing the advantage of disposing a windshield at a position overlapped with the hood.

Solution

According to a characterizing feature of a work vehicle relating to the present invention:

a windshield provided at a front portion of a vehicle body is comprised of an upper shield disposed upwardly of a hood and a lower shield that can be disposed at a position closing a gap formed between a lower end of the upper shield and an upper face of the hood; and there is provided a support unit configured to support the lower shield vertically movably to be capable of selectively disposing the lower shield at the closing position for closing the gap and an opening position for opening the gap.

With the above-described characterizing arrangement, by disposing the lower shield at the closing position, the gap between the lower end of the upper shield and the upper face of the hood can be closed by the lower shield. Further, in case the lower shield is disposed at the opening position, it is possible to create the gap between the lower end of the lower shield and the upper face of the hood.

Therefore, it has become possible to provide a work vehicle that allows opening/closing of a hood without impairing the advantage of disposing a windshield at a position overlapped with the hood. Moreover, with this arrangement, opening and closing operations of the hood are not troublesome since there is no need for detaching the lower shield.

According a further arrangement to be preferably added to the above arrangement:

the support unit includes a support frame fixed to the vehicle body side, a bracket attached to the lower shield and a pair of link members provided between the support frame and the bracket; and base end portions of the pair of link members are pivotally supported to the support frame via a horizontally oriented first support shaft and pivotal end portions of the pair of link members are pivotally supported to the bracket via a horizontally oriented second support shaft.

With the above-described arrangement, selective disposing of the lower shield at the closing position and the opening position is realized in such a manner that when the lower shield is operated, the link members are pivoted to move the lower shield in translation therewith.

According a further arrangement to be preferably added to the above arrangement, the support unit includes an urging member configured to set a dead point in middle of a movable range of the bracket.

With the above-described arrangement, if the lower shield is operated to the upper side beyond a position corresponding to the dead point, the lower shield will be maintained at the opening position by an urging force provided by the urging member. Conversely, if the lower shield is operated to the lower side beyond the position corresponding to the dead point, the lower shield will be maintained at the closing position by the urging force of the urging member. In this way, by providing an urging member for setting a dead point as described above, there is no need for any separate mechanism for maintaining the positions of the lower shield.

According a further arrangement to be preferably added to the above arrangement:

the hood is openable by an operation of lifting up a front end side thereof about a horizontally oriented opening/closing support shaft provided on a rear side thereof, when the lower shield is moved to the closing position, the position of the lower shield is determined as the lower end of the lower shield comes into contact with the upper face of the hood; and when the lower shield is moved to the opening position, the position of the lower shield is determined as an upper end of the lower shield comes into contact with an outer face of the upper shield.

With the above-described arrangement, by disposing the lower shield at the closing position, the lower end of the lower shield comes into contact with the upper face of the hood, so that no gap is formed between the lower end of the lower shield and the hood. On the other hand, by disposing the lower shield at the opening position, the position is determined as the upper end of the lower shield comes into contact with the outer face of the upper shield. Thus, without need to provide a stopper separately, the lower shield can be maintained in position. Further, when the lower shield is disposed at the opening position, the hood can be opened by lifting up the front end side of the hood.

According a further arrangement to be preferably added to the above arrangement, at the lower end of the lower shield, there is provided a contact member which comes into contact with the upper face of the hood when the lower shield is located at the closing position.

With the above-described arrangement, as the contact member, a flexibly deformable rubber or resin can be employed, so that as this contact member, it is also possible to employ a member having a lower end shaped to conform to the front face of the hood. Thus, it is possible to resolve the inconvenience of a gap being formed between the lower shield and the front face of the hood when the lower shield is disposed at the closing position.

According a further arrangement to be preferably added to the above arrangement:

a pair of left and right ROPS frames are provided in an area extending upwardly and rearwardly from a position overlapped with a rear portion of the hood as seen in a side view; and the upper shield is fixed to the left and right ROPS frames and the support frame of the support unit is also fixed to the left and right ROPS frames.

With the above-described arrangement, by fixing the upper shield to the pair of left and right ROPS frames included in the vehicle body and providing these left and right ROPS frames with a supporting mechanism, the lower shield can be vertically movably supported to the lower side of the upper shield.

BRIEF DESCRIPTION OF THE DRAWINGS

FIG. 5A is a side view showing the lower shield disposed at a closing position and a left side support unit, FIG. 5B is a side view showing the lower shield disposed at the closing position and a right side support unit.

EMBODIMENTS

Next, embodiments of the present invention will be explained with reference to the accompanying drawings.

[General Configuration]

Figure 1:
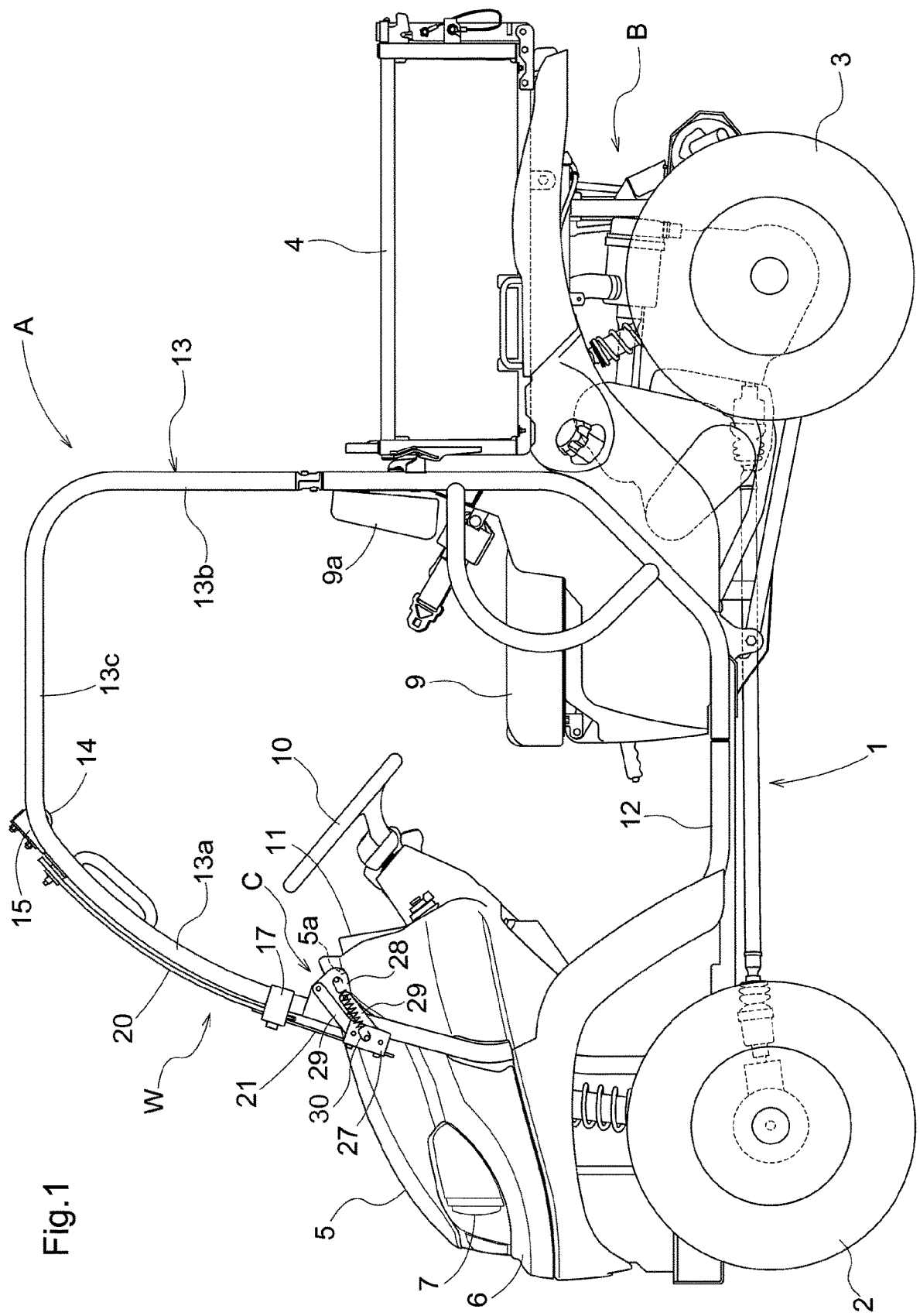
FIG. 1 is a side view of a work vehicle.

As shown in FIG. 1, a work vehicle comprises a pair of left and right front wheels 2 provided at front portions of a vehicle body 1, a pair of left and right rear wheels 3 provided at rear portions of the vehicle body 1, a driving section A provided at a center portion of the vehicle body 1, a load carrying deck 4 provided at a rear portion of the vehicle body 1, and an engine section B provided under the load carrying deck 4.

This work vehicle is a four-wheel drive type configured such that drive power from the engine section B is transmitted to the front wheels 2 and the rear wheels 3 and is configured as a utility vehicle for use in multiple-purpose works such as agricultural works, a load carrying work, etc. The load carrying deck 4 can be switched to a forwardly elevated inclined posture by an operation of a dump cylinder (not shown), so that its load can be discharged to the rear side under the gravity effect.

Figure 2:
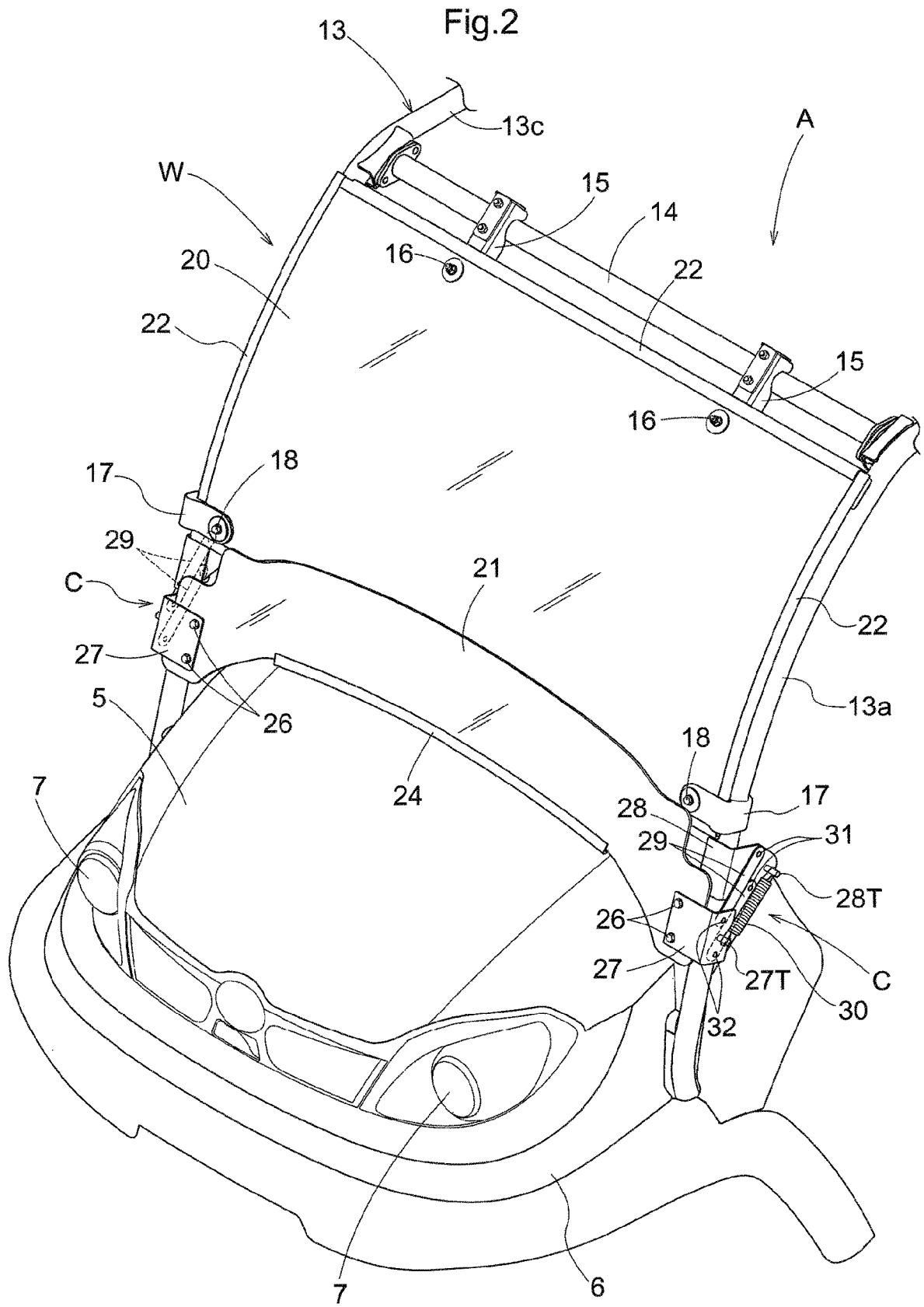
FIG. 2 is a perspective view showing a front portion of the work vehicle and a windshield.

As shown in FIG. 1 and FIG. 2, at the front end of the vehicle body 1, there are provided a hood 5 and a pair of left and right fenders 6 covering the upper portions of the left and right front wheels 2, and at front portions of the left and right fenders 6, head lamps 7 are provided.

[Driving Section]

Figure 3:
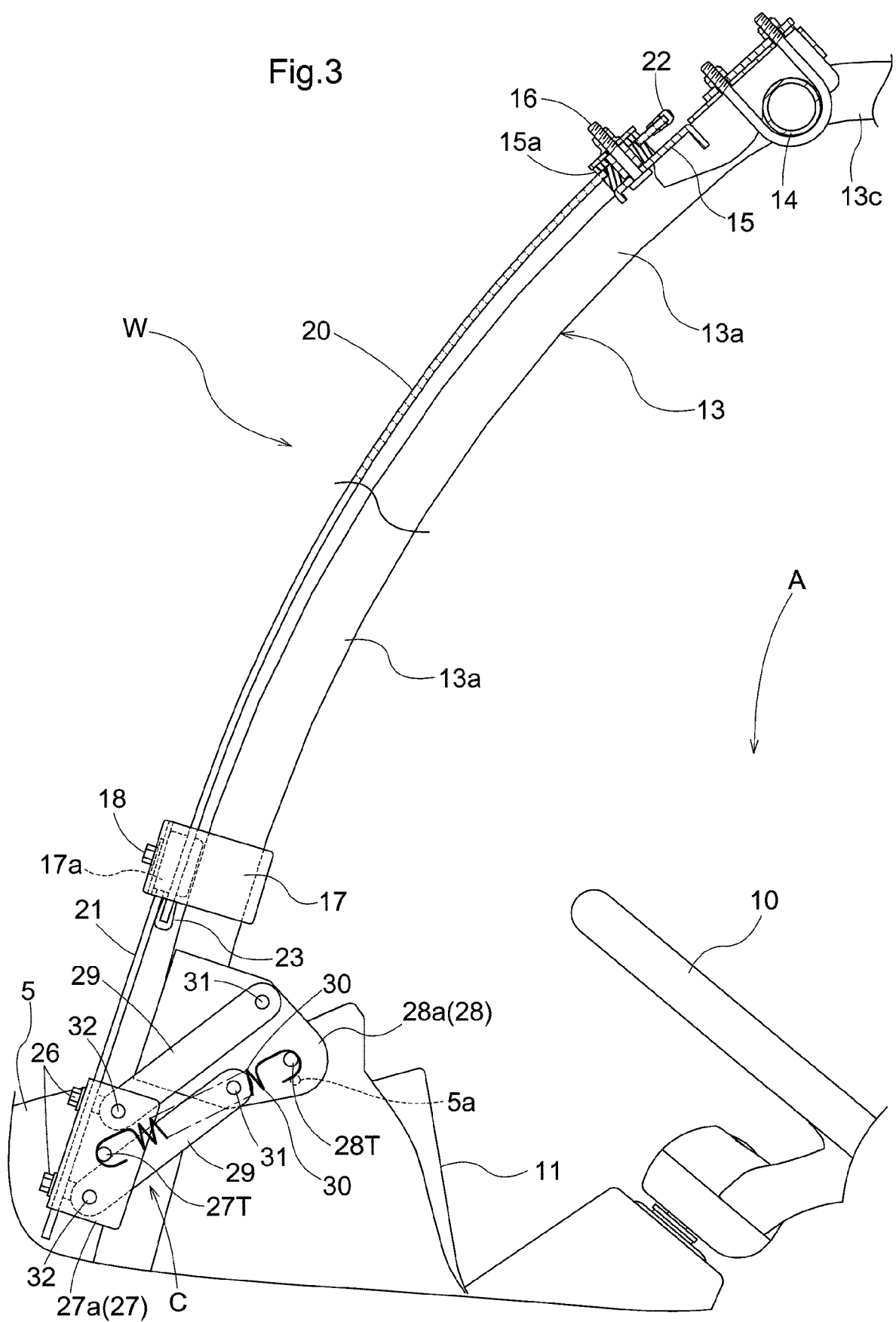
FIG. 3 is a side view showing the windshield and a support unit.

As shown in FIG. 1 and FIG. 3, a driving section A includes a driver's seat 9 at which a driver is to be seated and forwardly of this driver's seat 9, there are disposed a steering wheel 10 for steering the front wheels 2 and a meter panel 11, and downwardly thereof, a floor 12 is provided. Incidentally, the driver's seat 9 is disposed on one side in the vehicle body left/right direction. And, though not shown, laterally adjacent the driver's seat 9, a passenger's seat is disposed. And, a seat back 9a disposed at rear portions of the driver's seat 9 and the passenger's seat is provided to extend for the entire width of the left/right direction of the vehicle body 1.

As shown in FIGS. 1 through 4, the driving section A includes ROPS frames 13 formed of bar-like members and provided at left and right positions in order to protect a driver and/or a passenger in the event of a fall or roll-over of the vehicle body 1. As seen in a side view, the left and right ROPS frames 13 include front pillar portions 13a assuming, on the front side, a forwardly downwardly inclined posture, rear pillar portions 13b assuming a vertically oriented posture on the rear side, and upper frame portions 13c disposed in the area extending from the upper ends of the front pillar portions 13a to the upper ends of the rear pillar portions 13b. The left and right ROPS frames 13 have their upper frame portions 13c interconnected via reinforcing frame 14.

Though not shown, each one of the left and right ROPS frames 13 is formed like a loop as seen in a side view, with the lower end of the front pillar portion 13a and the lower end of the rear pillar portion 13b being interconnected on the level of the floor 12. With this, the ROPS frames 13 are provided with high strength.

[Windshield]

As shown in FIGS. 1 through 4, in the driving section A, a windshield W is disposed forwardly of the driver's seat 9 under a posture along the front pillar portions 13a of the left and right ROPS frames 13 and forwardly of the left and right front pillar portions 13a. The windshield W includes an upper shield 20 fixedly supported to the front pillar portions 13a of the ROPS frames 13 and a lower shield 21 vertically movably supported to the front pillar portions 13a.

In order to support the lower shield 21 vertically movably, the left and right front pillar portions 13a include support units C. The left and right support units C support opposed ends of the lower shield 21. The left and right support units C allow vertical movements of the lower shield 21 by a manual operation. Details of this support unit C will be described later herein.

As shown in FIG. 1, the front pillar portions 13a of the left and right ROPS frames 13 are disposed on the front side by a set amount from the rear end portion of the hood 5. Further, the left and right ROPS frames 13 are disposed on the outer sides of the rear portion of the fenders 6 in the left/right direction. As shown in FIG. 5B, an opening/closing support shaft 5a of the hood 5 is disposed rearwardly of the rear end of the lower shield 21.

With such positional relationship described above, in order to allow opening of the hood 5 by lifting up the front portion of the hood 5, a gap is formed between the lower end of the upper shield 20 and the upper face of the hood 5.

More particularly, when the lower shield 21 is disposed at a closing position shown in FIGS. 2 through 4 and FIG. 5A and FIG. 5B, a lower line seal 24 (an example of "contact member") provided at the lower end of the lower shield 21 comes into contact with the upper face of the hood 5 set under its closed state. And, due to this positional relationship, the lower shield 21 is maintained at a position closing the gap formed on the lower side of the upper shield 20.

Figure 7A:
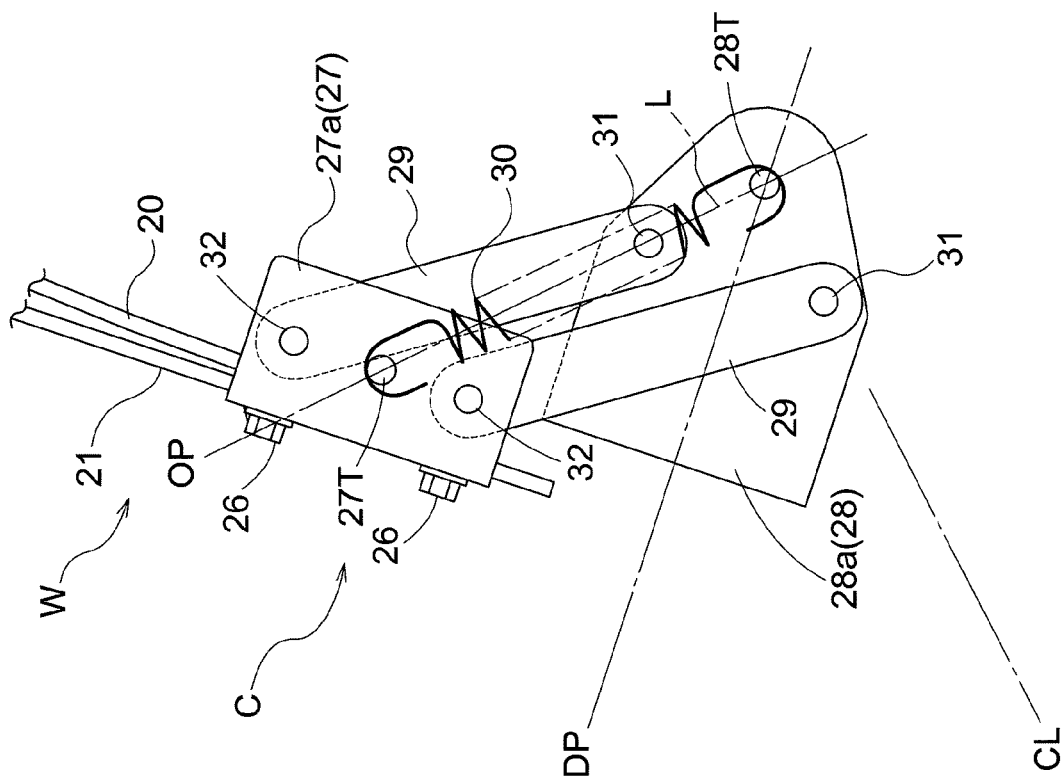
FIG. 7A is a side view showing the lower shield disposed at an opening position and the left side support unit.
Figure 7B:
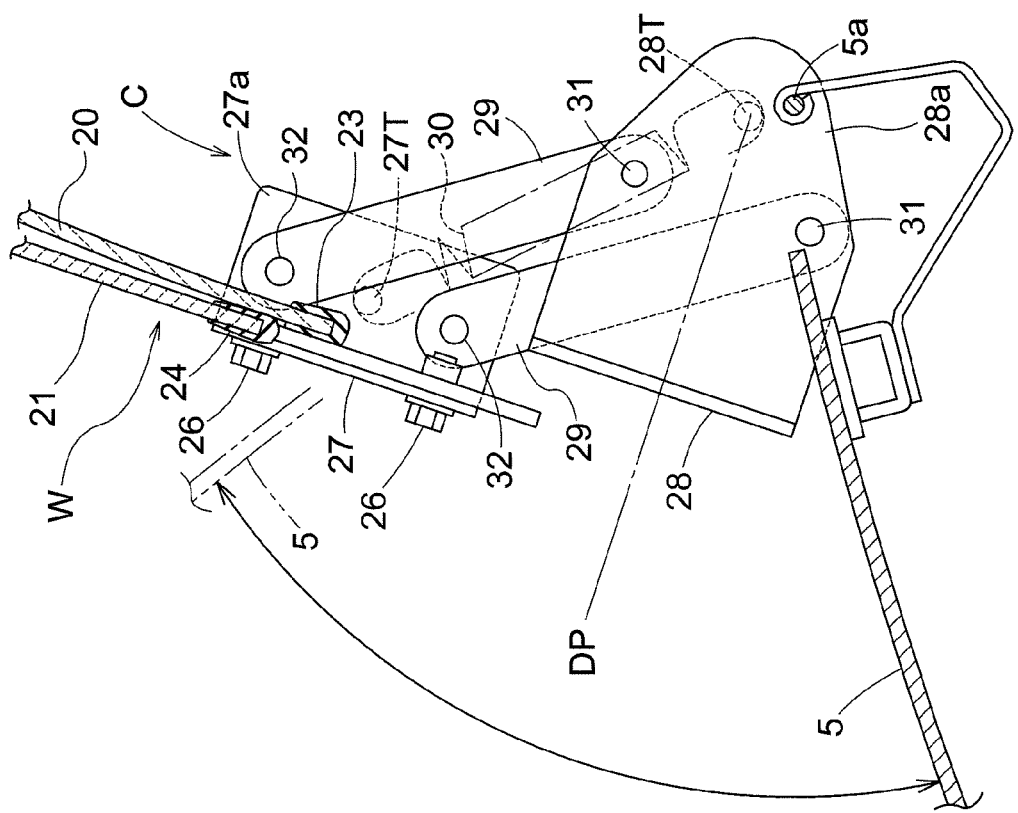
FIG. 7B is a side view showing the lower shield disposed at the opening position and the right side support unit.

On the other hand, when the hood 5 is to be opened, the lower shield 21 is lifted by a manual operation, whereby, as shown in FIG. 7A and FIG. 7B, the support units C allow upward movement of the lower shield 21, thus reaching an opening position shown in FIG. 7A and FIG. 7B. With this movement, the space on the lower side of the lower shield 21 is opened, thus allowing opening of the hood 5.

Figure 6A:
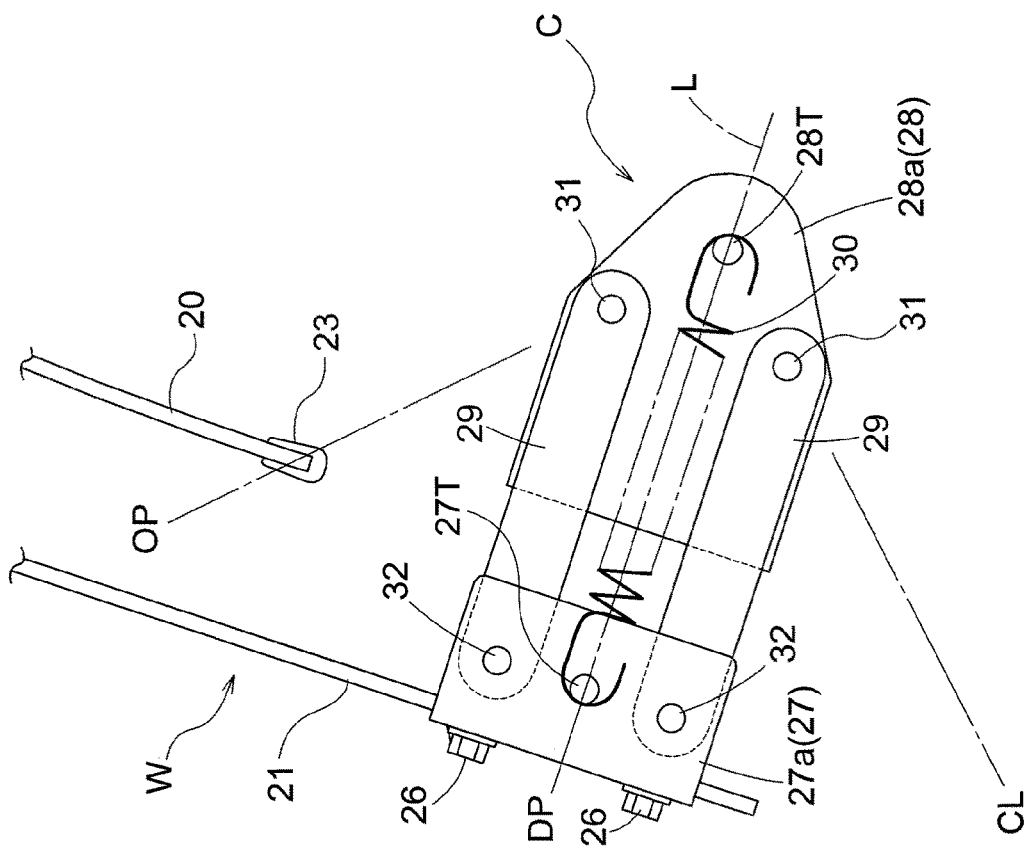
FIG. 6A is a side view showing the lower shield disposed at a mid position in its operational area and the left side support unit.
Figure 6B:
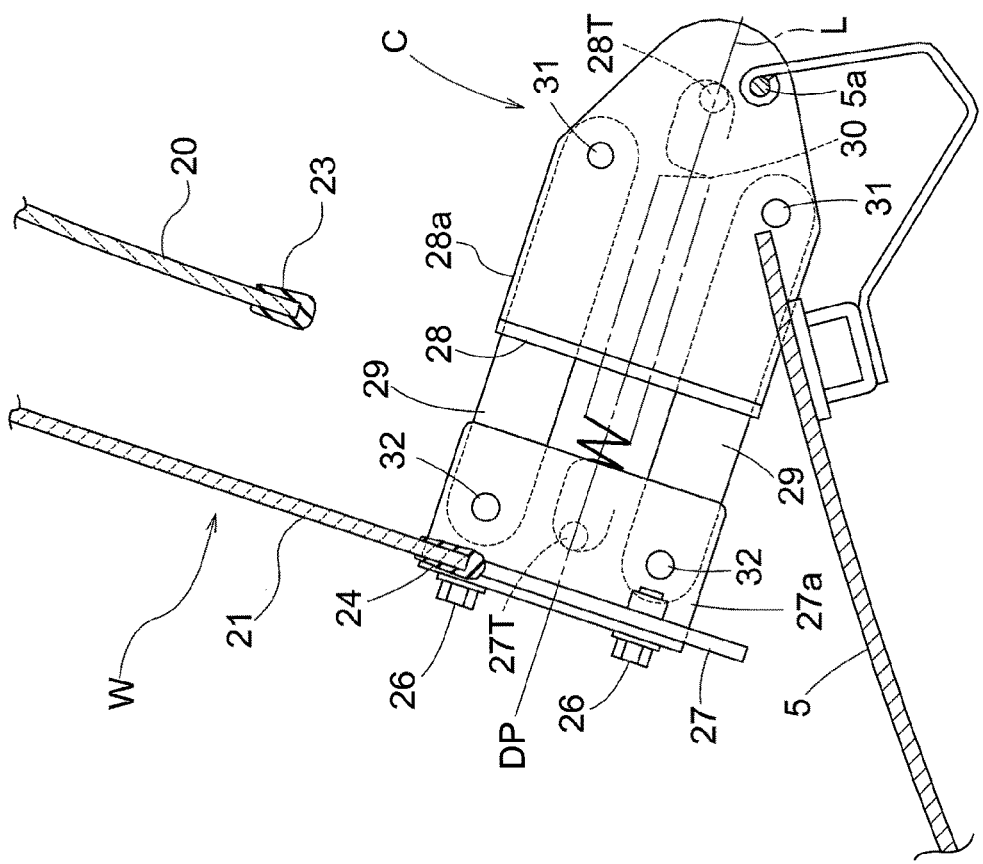
FIG. 6B is a side view showing the lower shield disposed at the mid position in its operational area and the right side support unit.

Further, when the lower shield 21 is to be manually operated from the closing position to the opening position or operated in the opposite way, as shown in FIG. 6A and FIG. 6B, a bracket 27 of the support unit C will pass a dead point DP provided in midway of an operational range. Upon passing through this dead point DP, the direction of an urging force provided from a spring 30 to the lower shield 21 is switched over, thus realizing toggling operation of the lower shield 21. This dead point DP will be described later together with details of the support unit C.

[Upper Shield and Lower Shield]

Figure 4:
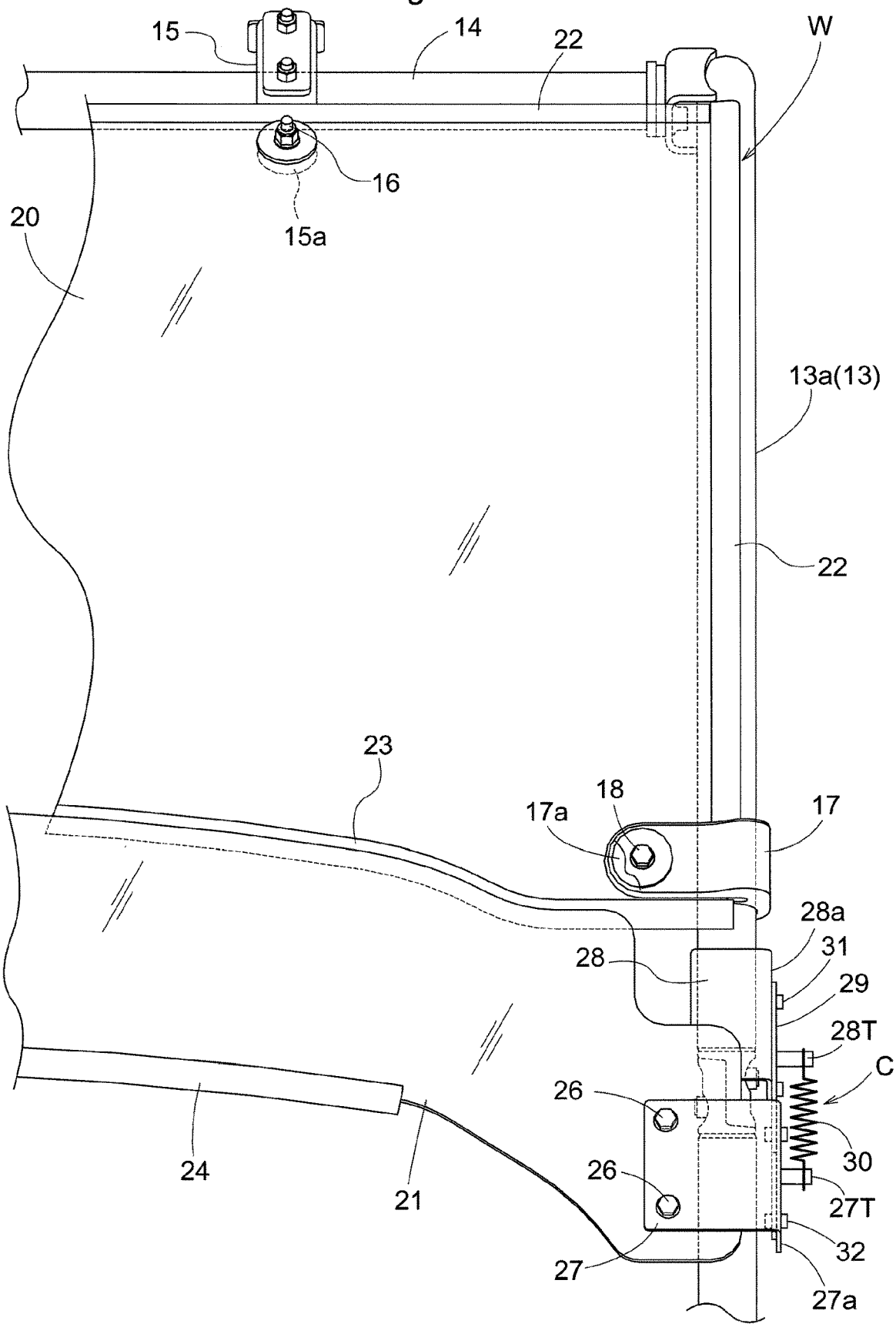
FIG. 4 is front view showing an upper shield, a lower shield and the support unit.

As shown in FIGS. 2 through 4, the lower shield 21 has its dimension in the vertical direction slightly longer than the vertical width of the gap. The upper shield 20 employs transparent glass material for its forming and the lower shield 21 employs high-strength transparent resin material such as polycarbonate for its forming. Incidentally, in the windshield W, it is conceivable to employ transparent glass material or transparent resin material for forming the upper shield 20 and the lower shield 21.

As shown in FIG. 3 and FIG. 4, left and right upper brackets 15 fixed to the reinforcing frames 14 include upper bushes 15a formed of flexible material such as rubber. And, the upper portion of the upper shield 20 is supported to the left and right ROPS frames 13 via upper bolts 16 extending through the upper bushes 15a and upper portions of the upper shield 20.

Further, left and right side brackets 17 fixed to the front pillar portions 13a of the left and right ROPS frames 13 are provided with side bushes 17a formed of flexible material such as rubber and the lower portion of the upper shield 20 is supported to the left and right ROPS frames 13 via lower bolts 18 extending through the side bushes 17a and the lower portions of the upper shield 20.

As shown in FIGS. 2 through 4, the upper edge and the left and right side edges of the upper shield 20 are formed linear (straight) and between and across the upper edge and the left and right side edges, a protection frame 22 is provided for covering these portions. The lower end of the upper shield 20 is formed in a curved shape with its left/right center portion thereof receded toward the upper side and along this lower edge, an intermediate line seal 23 is provided.

The lower shield 21 has its upper end formed in a shape along the lower end of the upper shield 20. More particularly, the lower end of the lower shield 21 is formed in a curved shape with its left/right center portion receded toward the upper side, like the lower edge of the upper shield 20 and at the left/right center portion of this lower end, a lower line seal 24 (an example of "contact member") is provided.

The intermediate line seal 23 and the lower line seal 24 each is formed as an elongate member using rubber or flexibly deformable resin material for its forming and defining in the longitudinal direction a receded groove in which an end portion of each shield is to be engaged.

[Support Unit]

As shown in FIG. 5A, FIG. 5B, FIG. 6A, FIG. 6B, FIG. 7A, FIG. 7B (to be referred to as FIGS. 5A through 7B hereinafter), the support units C are configured to maintain the lower shield 21 at the closing position for closing the gap formed between the lower end of the upper shield 20 and the upper face of the hood 5 or the opening position for opening this gap and have also a function of allowing operations of the lower shield 21 between these positions.

As shown in FIGS. 2-4 and FIGS. 5A through 7B, each support unit C includes a bracket 27 connected and fixed to the left/right outer end portion of the lower shield 21 via a screw 26, a support frame 28 fixedly welded to the front pillar portion 13a, a pair of link members 29 for vertically movably supporting the bracket 27 to the support frame 28, and a tensile coil type spring 30 (an example of "urging member") for determining a pivotal posture of the pair of link members 29.

Since the left and right support units C have the pair of link members 29 and the single spring 30 disposed on the outer side of the vehicle body, the left and right support units C are disposed under such a posture that the bracket 27 and the support frame 28 are disposed under postures in symmetry relative to the left/right center of the vehicle body 1.

The bracket 27 includes a support portion 27a under a posture extending from a connecting portion disposed in gapless contact with the front face of the lower shield 21 to the vehicle body rear side and to this support portion 27a, a pair of second support shafts 32 and a single front support shaft 27T are disposed to protrude under a horizontal posture toward the outer side.

The support frame 28 includes a plate portion 28a under a posture extending from the connecting portion to be fixedly connected to the front pillar portion 13a of the ROPS frame 13 toward the vehicle body rear side and, to this plate portion 28a, a pair of first support shafts 31 and a single rear support shaft 28T are disposed to protrude toward the outer side.

The pair of link members 29 define support holes at the longitudinal opposed ends thereof. Further, as the corresponding first support shafts 31 are inserted through the support holes at the rear ends of the pair of link members 29, the base end portions of the pair of link members 29 are pivotally supported to the support frame 28. Similarly, as the corresponding second support shafts 32 are inserted through the support holes at the front ends of the pair of link members 29, the pivotal end portions of the pair of link members 29 are pivotally supported to the bracket 27. Further, the spring 30 is provided between the front support shaft 27T of the bracket 27 and the rear support shaft 28T of the support frame 28.

The support unit C constitutes a parallel quad-link mechanism with the bracket 27, the support frame 28 and the pair of link members 29. With this, when a manual force is applied in the direction for vertically moving the lower shield 21, a resultant pivotal movement of the pair of link members 29 allow a vertical movement of the lower shield 21 and at the time of this movement, the posture of the lower shield 21 is maintained as seen in the side view.

With this support unit C, as shown in FIGS. 5A through 7B, as seen in the side view, there is assumed a virtual straight line L which connects the rear support shaft 28T to the front support shaft 27T. As shown in FIG. 5A, the posture of this virtual straight line L when the lower shield 21 is disposed at the closing position is defined as a closing posture CL. And, as shown in FIG. 7A, the posture of the virtual straight line L when the lower shield 21 is disposed at the opening position is defined as an opening posture OP.

Further, in order to allow the toggle operation of the lower shield 21, the dead point DP is set in midway of the movable range of the bracket 27. This dead point DP corresponds to the posture where the spring 30 is maximally pulled in the pivotal range of the pair of link members 29. Therefore, in case the virtual straight line L is located downwardly of the dead point DP, the urging force of the spring 30 is effective in the direction for moving the bracket 27 downwards. Conversely, in case the virtual straight line L is located upwardly of the dead point DP, the urging force of the spring 30 is effective in the direction for moving the bracket 27 upwards.

With the above-described configuration, e.g. when the lower shield 21 is manually operated from the closing position to the opening position, the virtual straight line L will be displaced upwards beyond the dead point DP from the lower side of this dead point DP, so that with the urging force of the spring 30, the virtual straight line L is operated to the opening posture OP. As a result of this operation, the lower shield 21 will reach the opening position and will be maintained at this opening position.

Further, when the lower shield 21 is manually operated from the opening position to the closing position, the virtual straight line L will be displaced downwards beyond the dead point DP from the upper side of this dead point DP, so that with the urging force of the spring 30, the virtual straight line L is operated to the closing posture CL. As a result of this operation, the lower shield 21 will reach the closing position and will be maintained at this closing position.

Moreover, as shown in FIG. 5A and FIG. 5B, in case the lower shield 21 is located at the closing position, thanks to the urging force of the spring 30, as shown in FIGS. 2, 4 and 5B, the condition of the lower line seal 24 of the lower shield 21 being in contact with the upper face of the hood 5 will be maintained.

In contract, as shown in FIG. 7A and FIG. 7B, in case the lower shield 21 is located at the opening position, thanks to the urging force of the spring 30, the condition of the back face of the lower shield 21 being in contact with the intermediate line seal 23 of the upper shield 20 from the vehicle body front side will be maintained. In particular, in case the lower shield 21 is located at the opening position, as this lower shield 21 is lifted up from the upper face of the hood 5, opening of the hood 5 about the opening/closing support shaft 5a is made possible.

Incidentally, as described above, since the bracket 27 is supported by a parallel quad-link mechanism, even when the lower shield 21 is located at an intermediate position between the closing position and the opening position, the posture of this lower shield 21 is effectively maintained, and there will occur no inconvenience of e.g. the upper end of the lower shield 21 coming into accidental contact with the upper shield 20.

Function and Effect of Embodiment

With the above-described arrangements, by setting the lower shield 21 to the closing position for closing the gap formed downwardly of the upper shield 20, intrusion of wind or rain to the driving section A during traveling can be effectively prevented. Further, by setting the lower shield 21 to the opening position, opening of the hood 5 in the form of lifting up the front side of the hood 5 is made possible, so that a work or maintenance within the space covered by the hood 5 can be carried out easily.

As the support units C are provided for supporting the left and right sides of the lower shield 21, for instance, even when only one end portion in the left/right direction of the lower shield 21 is manually operated, this force can be applied to the lower shield 21 with its left and right sides being supported by the urging forces of the springs 30 on the left and right sides, so that a vertical movement of the lower shield 21 can be effected with a light operational feel.

Incidentally, in comparison with an arrangement of opening the gap under the upper shield 20 by detaching the lower shield 21, the above-described inventive arrangement of allowing a vertical movement of the lower shield via the left and right support units C provides this work vehicle with an advantage of eliminating the trouble of removing the lower shield 21 as well as the need for a separate space to be reserved for storage of the removed lower shield 21.

When the lower shield 21 is located at the closing position, thanks to the urging force of the springs 30, the condition of the lower line seals 24 of the lower shield 21 being in placed in contact with the upper face of the hood 5 is maintained. Therefore, even in the possible event of application of vibration from the outside, no gap will be formed between the lower shield 21 and the hood 5. Moreover, when the lower shield 21 is located at the opening position, thanks to the urging forces of the springs 30, the condition of the upper portion of the lower shield 21 being placed in contact with the front face of the upper shield 20 will be maintained. Thus, even if no special locking operation for maintaining the lower shield 21 is effected, opening and closing of the hood 5 can be carried out easily.

Other Embodiments

The present invention may be embodied other than the foregoing embodiment as follows (in the following discussion, components having same or substantially same functions as those in the foregoing embodiment will be provided with same reference marks or signs).

(a) In the foregoing embodiment, the downward movement limit of the lower shield 21 is determined as the lower line seals 24 are brought into contact with the upper face of the hood 5. In place of this, it is conceivable to provide a stopper for determining the downward movement limit of the lower shield 21. And, similarly, it is conceivable to provide a stopper for determining the upward movement limit of the lower shield 21.

As specific examples of this further embodiment (a), a stopper may be provided at a position to come into contact with the link member 29 when the link member 29 has reached a predetermined posture, or a stopper may be provided at a position to come into contact with the bracket 27 when the bracket 27 has reached a predetermined posture.

(b) The support unit C may omit the spring 30, but may include instead a retaining mechanism such as a clamp, a locking member, or the like for maintaining the lower shield 21 at the closing position and the opening position. With provision of such retaining mechanism, the spring 30 can be omitted and also the vertical operations of the lower shield 21 can be effected with a light force.

(c) As the contact member, in place of the arrangement using the lower line seal 24, a resin material shaped to conform to the upper face of the hood 5 may be provided at the lower end of the lower shield 21. With use of such resin material too, no gap may be formed between the lower end of the lower shield 21 and the upper face of the hood 5. Further, a resin material which comes into gapless contact with the lower end of the lower shield 21 may be provided on the upper face of the hood 5.

(d) This work vehicle is not limited to the configuration having the ROPS frames 13. For instance, it may be applied also to one in which the upper shield 20 is fixed to a cabin of the driving section A and the lower shield 21 is vertically movably supported to the cabin.

INDUSTRIAL APPLICABILITY

The present invention is applicable to a work vehicle having a windshield disposed rearwardly of a hood and forwardly of a driver's seat.

DESCRIPTION OF REFERENCE SIGNS

5: hood
5a: opening/closing support shaft
13: ROPS frame
20: upper shield
21: lower shield
24: lower line seal (contact member)
27: bracket
28: support frame
29: link member
30: spring (urging member)
31: first support shaft
32: second support shaft
C: support unit
W: windshield
DP: dead point

The invention claimed is:
1. A work vehicle, comprising:
a windshield provided at a front portion of a vehicle body, the windshield comprising:
an upper shield disposed upwardly of a hood; and
a lower shield that can be disposed at a position closing a gap formed between a lower end of the upper shield and an upper face of the hood; and
a support unit configured to support the lower shield vertically movably to be capable of selectively disposing the lower shield at a closing position for closing the gap and an opening position for opening the gap,
wherein the support unit comprises a support frame fixed to a vehicle body side, a bracket attached to the lower shield and a pair of link members provided between the support frame and the bracket;
wherein base end portions of the pair of link members are pivotally supported to the support frame via a horizontally oriented first support shaft and pivotal end portions of the pair of link members are pivotally supported to the bracket via a horizontally oriented second support shaft, and
wherein the pair of link members are arranged in parallel.
2. A work vehicle, comprising:
a windshield provided at a front portion of a vehicle body, the windshield comprising:
an upper shield disposed upwardly of a hood; and
a lower shield that can be disposed at a position closing a gap formed between a lower end of the upper shield and an upper face of the hood; and
a support unit configured to support the lower shield vertically movably to be capable of selectively disposing the lower shield at a closing position for closing the gap and an opening position for opening the gap,
wherein the support unit comprises a support frame fixed to a vehicle body side, a bracket attached to the lower shield and a pair of link members provided between the support frame and the bracket,
wherein base end portions of the pair of link members are pivotally supported to the support frame via a horizontally oriented first support shaft and pivotal end portions of the pair of link members are pivotally supported to the bracket via a horizontally oriented second support shaft, and
wherein the support unit comprises an urging member configured to set a dead point in middle of a movable range of the bracket.
3. The work vehicle of claim 2, wherein:
the hood is openable by an operation of lifting up a front end side thereof about a horizontally oriented opening/closing support shaft provided on a rear side thereof;
when the lower shield is moved to the closing position, the position of the lower shield is determined as the lower end of the lower shield comes into contact with the upper face of the hood; and
when the lower shield is moved to the opening position, the position of the lower shield is determined as an upper end of the lower shield comes into contact with an outer face of the upper shield.
4. The work vehicle of claim 3, wherein the lower end of the lower shield comprises a contact member which comes into contact with the upper face of the hood when the lower shield is located at the closing position.
5. A work vehicle, comprising:
a windshield provided at a front portion of a vehicle body, the windshield comprising:
an upper shield disposed upwardly of a hood; and
a lower shield that can be disposed at a position closing a gap formed between a lower end of the upper shield and an upper face of the hood; and
a support unit configured to support the lower shield vertically movably to be capable of selectively disposing the lower shield at a closing position for closing the gap and an opening position for opening the gap,
wherein the support unit comprises a support frame fixed to a vehicle body side, a bracket attached to the lower shield and a pair of link members provided between the support frame and the bracket, wherein base end portions of the pair of link members are pivotally supported to the support frame via a horizontally oriented first support shaft and pivotal end portions of the pair of link members are pivotally supported to the bracket via a horizontally oriented second support shaft, wherein the work vehicle further comprises a pair of left and right roll-over protection system frames provided in an area extending upwardly and rearwardly from a position overlapped with a rear portion of the hood as seen in a side view, and wherein the upper shield is fixed to the left and right roll-over protection system frames and the support frame of the support unit is also fixed to the left and right roll-over protection system frames.

* * * * *